United States Patent
Roba et al.

(10) Patent No.: US 6,584,808 B1
(45) Date of Patent: Jul. 1, 2003

(54) METHOD OF MANUFACTURING AN OPTICAL FIBER PREFORM BY COLLAPSING A TUBE ONTO A ROD

(75) Inventors: Giacomo Stefano Roba, Monza (IT); Cheryl Jane Garnham, Plaitford (GB); Anna Zilnyk, Harlow-Essex (GB)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/505,672

(22) Filed: Feb. 17, 2000

Related U.S. Application Data

(63) Continuation of application No. PCT/EP98/05259, filed on Aug. 19, 1998.
(60) Provisional application No. 60/057,480, filed on Sep. 3, 1997.

(30) Foreign Application Priority Data

Aug. 19, 1997 (EP) .............................................. 97114268

(51) Int. Cl.⁷ ............................................. C03B 37/027
(52) U.S. Cl. ........................................................ 65/412
(58) Field of Search ................................. 65/412, 409

(56) References Cited

U.S. PATENT DOCUMENTS

| | | | |
|---|---|---|---|
| 3,279,902 A | * 10/1966 | Gardner ................. | 29/890.043 |
| 3,711,262 A | 1/1973 | Keck et al. ........................ | 65/3 |
| 3,876,560 A | 4/1975 | Kuo et al. ................... | 252/514 |
| 4,062,665 A | 12/1977 | Izawa et al. ...................... | 65/3 |
| 4,154,591 A | 5/1979 | French et al. ..................... | 65/2 |

(List continued on next page.)

FOREIGN PATENT DOCUMENTS

| | | | | |
|---|---|---|---|---|
| EP | 0 244 135 | 11/1987 | | |
| EP | 249230 | * 12/1987 | .................. | 65/412 |
| EP | 501429 | * 9/1992 | .................. | 65/412 |
| GB | 1 435 523 | 5/1976 | | |
| GB | 2 284 206 | 5/1995 | | |
| JP | 53-144758 | * 12/1978 | .................. | 65/412 |
| JP | 60-176941 | * 9/1985 | .................. | 65/412 |
| JP | 63-170235 | 7/1988 | | |
| JP | 63-256545 | * 10/1988 | .................. | 65/412 |

OTHER PUBLICATIONS

S. Morimoto, Patent Abstracts of Japan, JP 60 155542, "Method for Molding Fiber for Optical Communication", Aug. 15, 1985, (Abstract Only).

Y. Yamanishi, Patent Abstracts of Japan, JP 62 176934, "Production of Optical Fiber Base Material", Aug. 3, 1987, (Abstract Only).

T. Gotou, Patent Abstracts of Japan, JP 57 118042, "Manufacture of Preform Rod for Optical Fiber", Jul. 22, 1982, (Abstract Only).

(List continued on next page.)

*Primary Examiner*—John Hoffmann
(74) *Attorney, Agent, or Firm*—Finnegan, Henderson, Farabow, Garrett & Dunner, L.L.P.

(57) ABSTRACT

Optical fibers are produced by means of a direct sleeving technique that allows the sintering and collapsing of the outer jacket tube onto the inner core rod to be achieved directly during the drawing phase of optical fiber manufacture. In the course of the optical fiber manufacturing process, either a mechanical guide holding a sleeving tube concentrically around an annular gap and core rod or a preform having an enclosed annular gap/cavity are mounted in a drawing tower. A vacuum may be maintained in the annular gap/cavity of this assembly. A heat source is then applied to one end of the preform/assembly such that the extreme end of the tube is collapsed onto the core as fiber is drawn in a controlled manner. This single-step process allows to speed up the sleeving process, without introducing possible asymetries in the final preform and in the fibers drawn therefrom.

9 Claims, 7 Drawing Sheets

U.S. PATENT DOCUMENTS

| | | | | |
|---|---|---|---|---|
| 4,578,096 | A | * | 3/1986 | Siegmund .................... 359/654 |
| 4,596,589 | A | | 6/1986 | Perry .......................... 65/3.12 |
| 5,160,522 | A | * | 11/1992 | Takagi et al. .................. 385/11 |
| 5,221,306 | A | | 6/1993 | Fleming, Jr. et al. ............. 65/2 |
| 5,295,205 | A | * | 3/1994 | Miller et al. .................... 385/1 |
| 5,578,106 | A | | 11/1996 | Fleming, Jr. et al. ......... 65/391 |
| 5,658,363 | A | * | 8/1997 | Ince et al. .................... 65/412 |
| 5,685,363 | A | | 11/1997 | Orihira et al. ................. 165/46 |
| 5,735,927 | A | * | 4/1998 | Sanghera et al. .............. 65/36 |
| 6,173,588 | B1 | * | 1/2001 | Berkey et al. ................. 65/36 |

OTHER PUBLICATIONS

Y. Furui, Patent Abstracts of Japan, JP 53 133044, "Production of Optical Fiber and Device for the Same", Nov. 20, 1978, (Abstract Only).

M. Kokayu, Patent Abstracts of Japan, JP 63 288926, "Production of Doped Quartz Optical Fiber", Nov. 25, 1988, (Abstract Only).

Y. Usui, Patent Abstracts of Japan, JP 53 144758, "Production of Glass Fibers for Optical Transmission", Dec. 16, 1978, (Abstract Only).

R. Yamauchi, Patent Abstracts of Japan, JP 02 160635, "Production of Glass Matrix for Optical Fiber", Jun. 20, 1990, (Abstract Only).

* cited by examiner

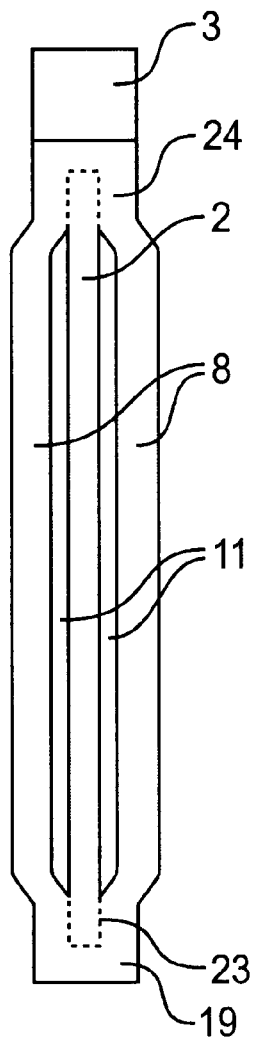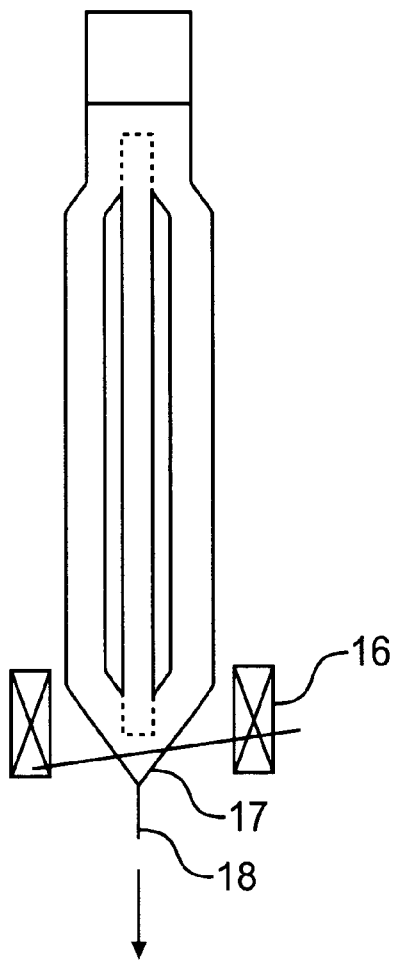
FIG. 1  FIG. 2

METHOD OF MANUFACTURING AN OPTICAL FIBER PREFORM BY COLLAPSING A TUBE ONTO A ROD

This application is a continuation of International Application No. PCT/EP98/05259, filed Aug. 19, 1998, the content of which is incorporated herein by reference and claims the benefit of U.S. Provisional Application No. 60/057,480, filed Sep. 3, 1997.

BACKGROUND OF THE INVENTION

The present invention relates to the fabrication of optical fiber and optical fiber preforms.

While potentially useful in a wide variety of applications, the present invention evolved and was further developed in the field of optical fiber manufacture. Optical fibers are thin strands of glass capable of transmitting a light wave signal containing a large amount of information over long distances with very low loss. An optical fiber typically consists of an inner cylinder made of glass, often referred to as the core, surrounded by a cylindrical shell of glass or plastic of lower refractive index, often referred to as the cladding.

Optical fibers have traditionally been manufactured by first constructing a preform of appropriate composition and then drawing fiber from that preform. A typical preform generally assumes the form of a solid, concentric glass rod having a length of about one meter and a typical diameter of 10–100 mm. The core of this preform is a high purity, low loss glass such as germanium silicate glass having a diameter of about 1–40 mm. The cladding is a layer of glass which surrounds the core and which has a lower index of refraction than the core.

There are a number of fabrication processes in use today to manufacture such a preform. In one process, commonly known as the lateral soot deposition technique and described in U.S. Pat. Nos. 3,711,262 and 3,876,560, glass particulate matter and doped halides are formed in a hydrolysis burner and deposited on a starting member such as a glass rod. Additional layers of glass, including a cladding layer, are deposited on the rod and the combination is consolidated onto a transparent rod by heating in an inert environment. This process, requires many passes (up to 200) of the hot soot stream and is therefore costly and time consuming. In addition, after the soot is deposited, the preform must be sintered in a controlled inert atmosphere such as helium, which is also very costly. Moreover, these additional requirements require extensive process controls that can even further delay production and increase costs.

Another fabrication process is commonly referred to as the modified chemical vapor deposition (MCVD) technique. In this technique, glass precursor vapors are directed through a hollow glass cylinder which is heated sufficiently to start a homogeneous reaction within the glass cylinder. During this reaction, glass particulate matter is formed, deposited on the inside of the glass cylinder, and subsequently fused into the cylinder by traversing the heat source. This technique also has problems related to inefficient deposition rates and starting tube needs which, in turn, negatively impact manufacturing economics and production schedules.

Still another technique for the fabrication of fiber preforms is the vapor.axial deposition process, or more commonly VAD. This process, described in U.S. Pat. No. 4,062,665, involves simultaneous flame deposition of both core and cladding soots onto the end of a rotating fused silica-bait rod. As the porous soot preform grows, it is slowly drawn through a graphite resistance furnace (carbon heater) where it is consolidated into a transparent glass preform by zone sintering. This process has all the disadvantages and problems associated with a flame hydrolysis burner containing doped halides, as found in the lateral soot deposition technique described above, except in this case there are two hydrolysis burners to control. The process control of the finished preform and the control of both burners must be precise.

In still another method of manufacturing an optical fiber preform, the core is manufactured from an inner solid doped silica glass rod and one or more sleeving tubes. In this method, as described in U.S. Pat. Nos. 4,154,591 and 4,596,589, a core rod is placed within a sleeving tube. The tube is then collapsed onto the rod by slowly traversing a heat source over the entire length of the tube. British patent Application GB 22284206 suggests welding a supporting rod (with a sealing-up part for sealing the sleeving, or over-cladding, tube) to a core rod and a supporting tube to the sleeving tube, said supporting tube having a purity different than that of the sleeving tube and including a ring for centering the core rod. The tube is then collapsed onto the rod by slowly traversing a heat source over the entire length of the tube, while rotating the assembly on a lathe. The methods disclosed in the above patents result however in slow and expensive processes in that the tube and rod are completely collapsed into a solid multilayered cylindrical mass prior to the actual drawing of the fiber.

An alternative method for collapsing a sleeving tube onto a glass rod is disclosed in Japanese patent application with publication no. 63-170235. In said patent it is suggested to collapse a first end of the tube onto the rod, then applying a negative pressure to the inside of the tube and eventually collapsing the opposite end of the tube onto the rod. Japanese Patent Application JP 60-155542 discloses a method wherein a core rod and a sleeving tube are disposed into a heating furnace for drawing and the respective bottom ends are softened by heat, fused, joined, and drawn downward to mold a fiber.

According to what observed by the Applicant, when the tube is collapsed onto the rod, particular attention should be paid in not introducing asymmetries into the preform geometry during both the fabrication and/or collapse of the preform into a solid mass, which asymmetries may be reflected in the cross-section of the resulting fiber, with consequent negative impact on the transmission properties of the fiber. In particular, when manufacturing a simple two-layered preform by collapsing a tube onto a rod, attention should be paid in correctly aligning the tube and the rod at the beginning of the process and maintaining the tube centered onto the rod during the whole collapsing process, for avoiding such asymmetries. At this regard, the Applicant has noticed that, according to the prior art methods, the alignment of the tube with the inner rod is achieved directly on the lathe for carrying out the collapsing of the tube onto the rod. This operation is however particularly troublesome, as the lathe is generally in a vertical position and the correct alignment of the tube with the rod generally requires specific glass working skills to be realized. In addition, the applicant has observed that also the temperature of the heat source used for collapsing the tube should be accurately controlled along the entire collapsing process. In particular, when only the opposite ends of the tube are collapsed onto the respective ends or the rod, particular attention should be paid to the heating of the uncollapsed zone of the tube, in order to minimize thermal stress areas in the assembled preform, while avoiding undesired collapsing in this zone.

SUMMARY OF THE INVENTION

Accordingly, the present invention is directed to a method of and an apparatus for manufacturing optical fibers by utilizing an improved direct sleeving technology that substantially obviates one or more of the problems observed by the Applicant associated with the prior art methods.

Additional features, objectives and advantages of the invention will be set forth in the description which follows, and in part will be apparent from the description, or may be learned by practice of the invention. The objectives and other advantages of the invention will be realized and attained by the method and apparatus particularly pointed out in the written description and claims hereof as well as the appended drawings.

To attain these and other advantages and in accordance with the purpose of the invention, as embodied and broadly described, the invention provides a fiber optic preform and method for making the same by centrally positioning a core rod within a sleeving tube, thereby providing an annular gap between the outer surface of the rod and the inner surface of the tube, thermally collapsing the extreme ends of the tube onto the respective extreme ends of the rod while maintaining the annular gap uncollapsed over a major length of the tube. A force for biasing the sleeving tube inwardly toward the rod, e.g. vacuum, is preferably applied to said annular gap so to facilitate the collapsing of the tube onto the rod.

The completed preform is then inserted into a drawing tower where heat is applied to one end of the preform so that the uncollapsed part of the sleeving tube collapses onto the rod as the fiber is being drawn from the extreme of that same collapsed end.

In particular, an aspect of the present invention relates to a method of making an optical fiber preform by inserting a glass rod into a glass tube, thereby providing an annular gap between the outer surface of the rod and the inner surface of the tube, and thermally collapsing the extreme ends of the tube onto the respective extreme ends of the rod while maintaining an uncollapsed annular gap over a major length of the tube, comprising the steps of:

centrally positioning a rod within a tube, providing an annular gap between the outer surface of the rod and the inner surface of the tube;

forming a mechanical seal between one end of said tube and said rod, while aligning said tube with said rod with respect to their longitudinal axis;

thermally collapsing a first section of the tube onto the rod by traversing a heat source along said first section of the tube at a predetermined collapse speed, said section being located at the opposite unsealed end of said tube, in order to sealingly close said opposite end of said tube and said rod;

applying a force for biasing the tube inwardly towards the rod;

moving the heat source towards a second section of the tube, located in the proximity of the sealed end of the tube, by traversing said heat source at a predetermined traverse speed, so to avoid any collapsing of the tube onto the rod between the two sections and to avoid any thermal cracking of the preform;

thermally collapsing said second section of the tube onto the rod by traversing said heat source along said second section of the tube at substantially said predetermined collapse speed.

Preferably, the force for biasing the tube inwardly towards the rod is achieved by applying a vacuum to the annular gap through the mechanical seal.

According to a preferred aspect of the present invention, said predetermined traverse speed of the heat source is from about two to about eight times higher than said predetermined collapse speed.

According to a preferred aspect of the present invention, the above method comprises:

centrally positioning the rod within the tube and forming the mechanical seal and alignment as above;

thermally collapsing a first portion of said first section of the tube, by traversing the heat source along said first portion of the tube at a predetermined collapse speed, in order to sealingly close said first portion of said tube onto said rod;

applying the vacuum;

moving the heat source to the second section of the tube and back to the first portion, traversing it at a first predetermined traverse speed;

thermally collapsing the remaining portion of said first section of the tube, by traversing the heat source along said remaining portion at substantially said predetermined collapse speed;

moving the heat source to the second section of the tube, traversing it at a second predetermined traverse speed;

thermally collapsing the second section of the tube onto the rod by traversing said heat source along said second section of the tube at substantially said predetermined collapse speed.

According to a preferred aspect, said first portion of the first section being collapsed is from about 10% to about 30% of the total section of the tube to be collapsed.

Said first and second predetermined traverse speed may be both from about two to about eight times higher than said predetermined collapse speed or, preferably, said first predetermined traverse speed is from about two to six times higher than said predetermined collapse speed, while said second predetermined traverse speed is from about four to eight times higher than said predetermined collapse speed.

According to a further preferred aspect, the step of forming a mechanical seal between one end of said tube and, said rod while aligning the rod within the tube is carried out by using a device, thus forming an assembly comprising the device and the aligned rod and tube, said assembly being then mounted on a glass lathe.

According to another aspect of the present invention, the device for aligning the rod within the tube and forming a mechanical seal between one end of said tube and said rod comprises a threaded body (37), threaded rings (38, 39 and 40), O-rings (12, 13 and 14) and split rings (32 and 33), the O-rings 12, 14 and the split rings 32, 33 cooperating, upon rotation of the threaded rings 38, 40, to provide the centralization of the rod with the tube and the mechanical seal.

According to a preferred aspect, said split rings are opened, being provided with a gap along their circumference.

A primary result of the new sleeving technique embodied in this invention is that, in contrast with conventional sleeving; methods, the entire length of the tube/cladding is not collapsed onto the core rod until the drawing phase of the manufacturing process. Because the actual sleeving is accomplished during fiber drawing, the invention greatly reduces preform and fiber production times and costs. The invention also offers a better control over the alignment of the assembled preform and on fiber geometry, as well as a reduction of the thermal stress areas in the assembled preform.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate several embodiments of the invention and together with the description serve to explain the principals of the invention. In the drawings, FIG. 1 is a schematic view of a preform incorporating the present invention;

FIG. 2 is a schematic view of the neck-down region of the preform obtained from practicing the method of FIG. 1;

DESCRIPTION OF THE PREFERRED EMBODIMENT

Reference will now be made in detail to the present preferred embodiment of the invention, examples of which are illustrated in the accompanying drawings. Wherever possible, the same reference numbers will be used throughout the drawings to refer to the same or like components.

As illustrated in FIG. 1, the optical fiber preform according to the present invention is assembled, in very general terms by: (1) first center mounting the core rod and sleeving tube onto a glass lathe and (2) thermally collapsing the extreme ends of the tube onto the rod.

Figure 3:
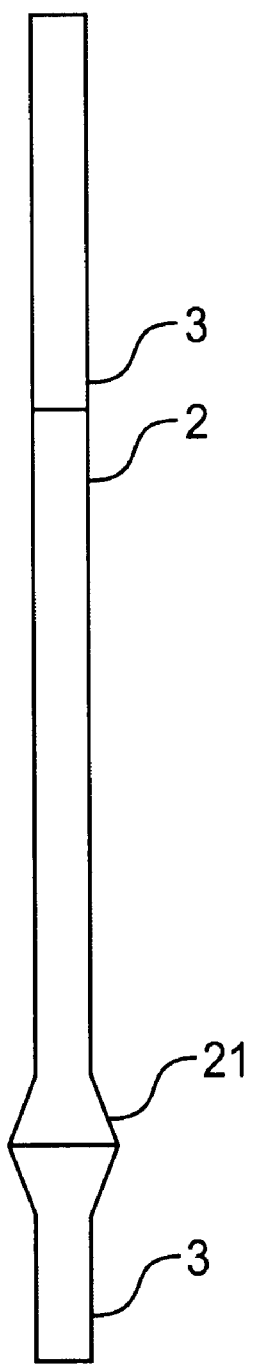
FIG. 3 is a schematic view of a prepared core rod.

In the first step of this preform manufacturing process, a core rod 2 is flame polished for cleanliness and inserted into a flame polished (at least at its ends and inner surface) sleeving tube 8. The rod may be perfectly concentric or is preferably modified, as illustrated in FIG. 3, to include welded handles 3 at both ends. Preferably, as disclosed in U.S. Pat. No. 5,685,363, here incorporated by reference, the welded handle at one end of the tube is modified to comprise an increased diameter section or annular rib 21, as shown in FIG. 3. The increased diameter section 21 should be sized to engage the inner wall of the tube 8; in this manner, the gap between the rod and the inner wall of the tube is reduced and the subsequent collapsing of the tube is facilitated. The rod is then inserted into the tube such that one end of the tube is in contact with the large diameter section 21 of the rod, thereby centralizing this end of the rod within the tube. The dimensions of the rod and of the tube are preferably selected in order that the difference between the inner diameter of the tube and the outside diameter of the rod is from about 0.5 mm to about 1.5 mm, preferably being about 1.0 mm, thereby providing a preferred annular gap between the two of about 0.5 mm. Typically, the diameter of the rod may vary from about 11 to about 25 mm. The outer diameter of the tube is typically comprised from about 20 to about 80 mm, the thickness of the walls being preferably comprised from about 4 to about 30 mm. The length of both the rod and the preform is typically comprised from about 800 mm and about one meter.

Figure 4:
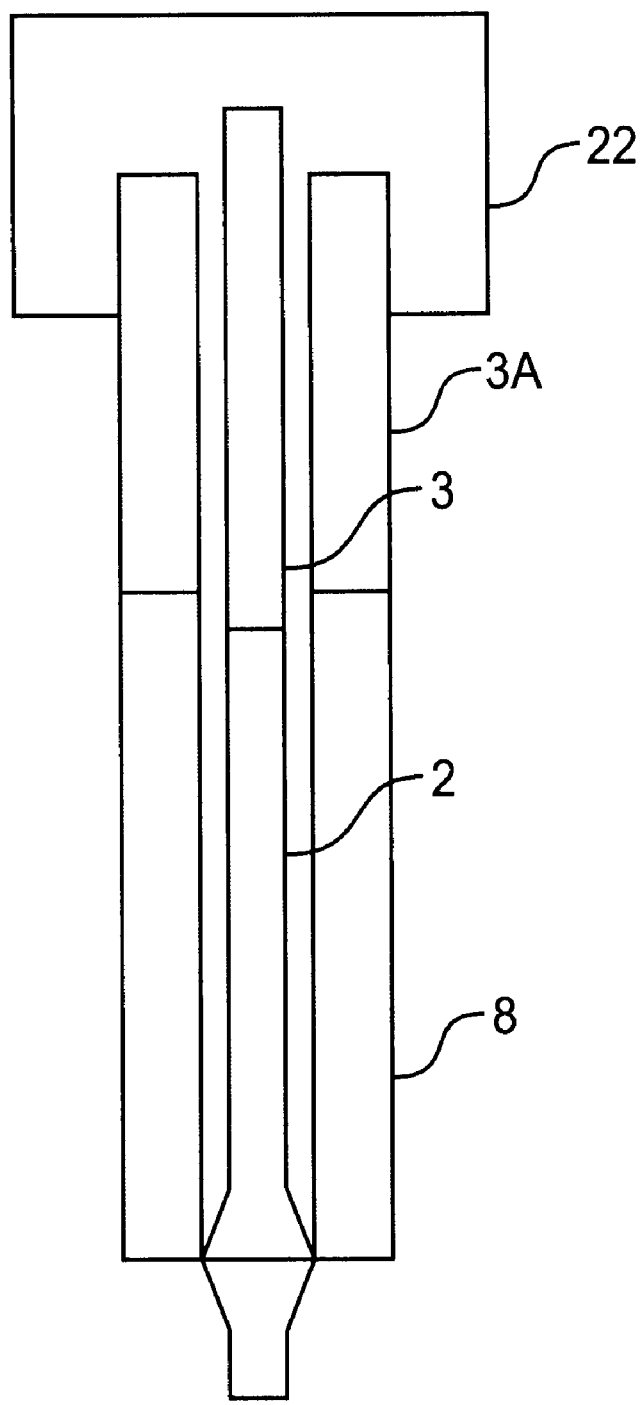
FIG. 4 is a schematic view of the rod of FIG. 3 inserted within a sleeving tube.
Figure 5:
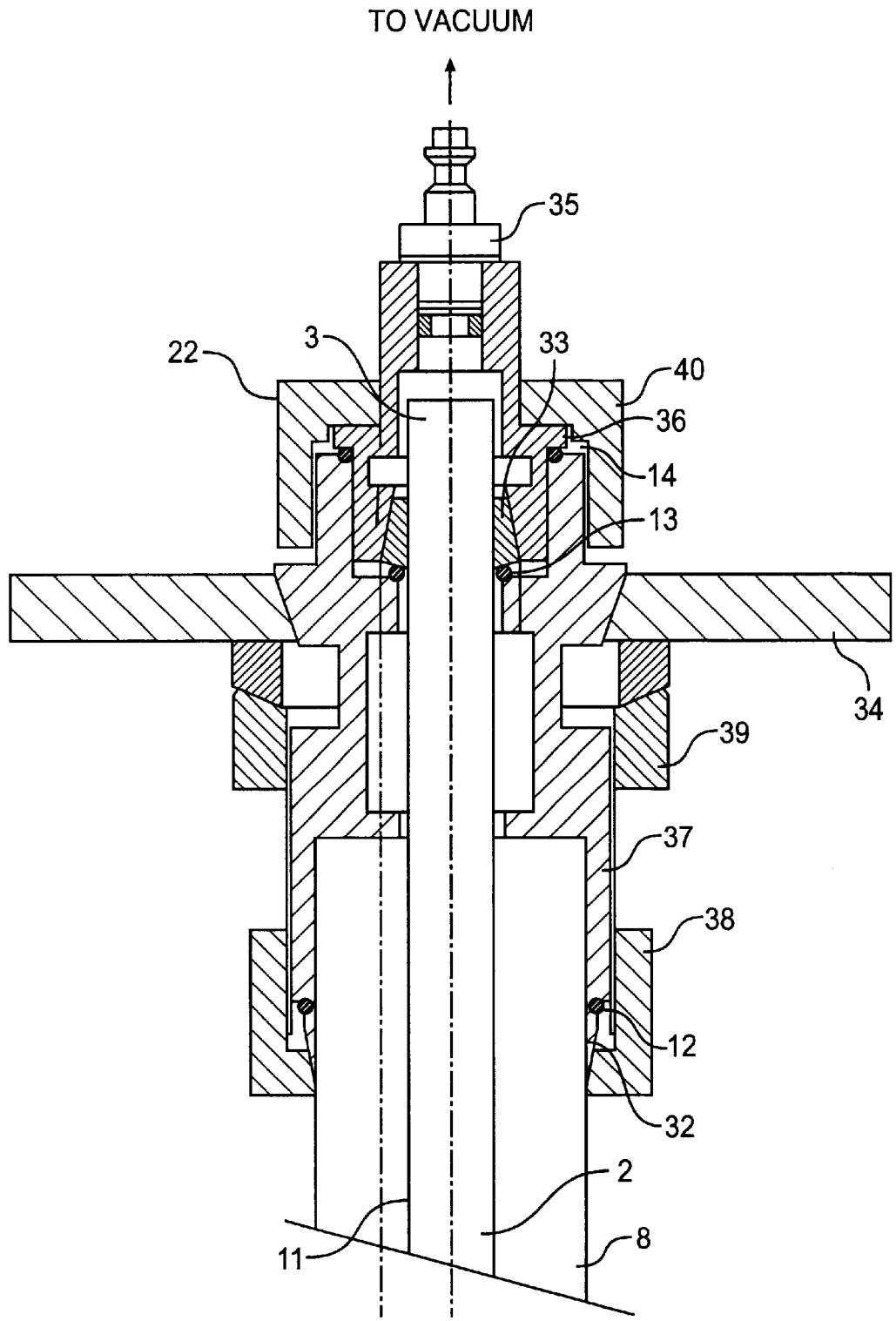
FIG. 5 is a cross-sectional view of an assembling device for preparing a preform according to FIG. 1.

The next step, as shown in FIG. 4, entails fitting a device 22 to the top of the rod and tube. The device, as shown in FIG. 5, comprises split rings 32, 33 and O rings 12, 13, 14 that not only centralize the top of the inner preform within the sleeve, but also create an airtight seal between the sleeving tube and the inner rod. This allows for a vacuum to be applied to the annular gap in the next step.

In particular, the device illustrated in FIG. 5 comprises a threaded body (37) and threaded rings (38, 39 and 40) made from a high grade stainless steel. O-rings (12, 13 and 14) are preferably made from an elastomeric material, in particular a fluoroelastomer, such as for instance Viton®. The split rings (32 and 33) are preferably made from a plastic material, which should be sufficiently smooth and soft in order not to cause any scratch or fracture onto the tube during the alignment process. For instance, fluorocarbon polymers, such as polytetrafluoroethylene (PTFE), can advantageously be employed as the material for the split rings.

The sealing and alignment mechanism in the device is provided by the compression of O-rings by split rings. For example, rotation of metal ring 38 forces the split collar 32 upwards and gives compression to O-ring 12 until a seal is obtained between the assembly and the sleeve handle which is able to withstand the required vacuum, while centering the tube within the assembly. This is also repeated by rotation of ring 40 which forces split collar 33 against O-ring 14 and hence forms an adequate seal against the preform rod, while concentrically aligning said rod with the tube and the assembly.

Figure 8:
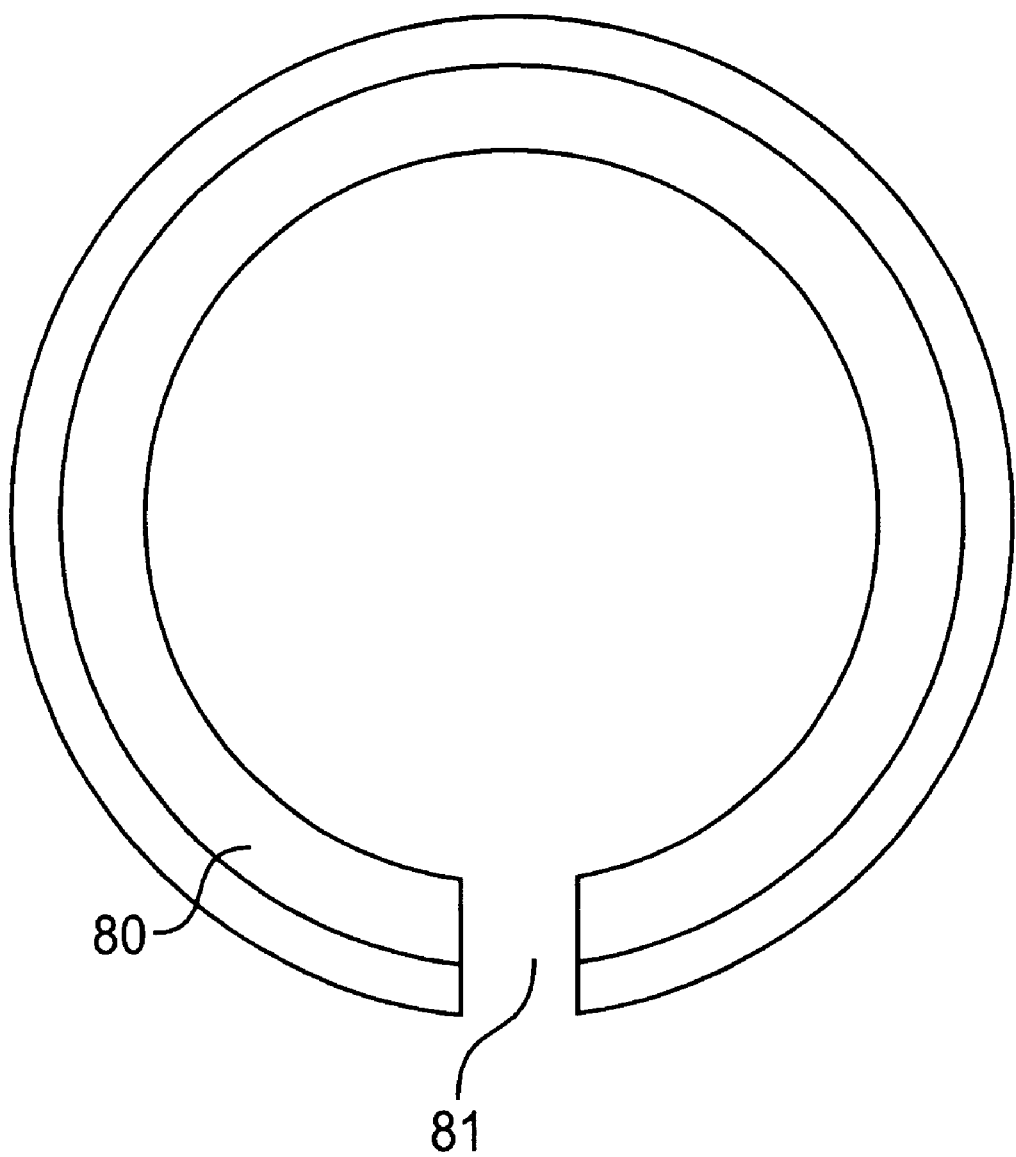
FIG. 8 is a top view of a split ring comprised in the assembling device of FIG. 5.

FIG. 8 shows in detail the top view of split ring 33. As shown in the figures, the outside surface of the split rings are preferably wedge shaped in comparison with the inside surface. In addition, the collars are preferably not complete rings but are opened, being provided on their circumference 80 with a gap 81 of several millimeters, typically from about 2 mm to about 4 mm. This gap allows a same split ring to be used for accommodating different tubes or rods with small diameter variations (typically of about 1–3 mm), without the need to change the split rings depending on the different dimensions of the rod or the tube. As a matter of fact, the dimensions of the device are such that a good sealing and alignment mechanism is still achieved if the gap in the split collar is increased when the split collars is placed on the outside surface of the rod or tube. The present device thus provides a method of firmly holding the rod and sleeve tube concentrically to each other. The actions of creating the seal with the collars and O-rings, as described above, results in the rod and the sleeve tube being unable to move. Therefore, the symmetry of the mechanical assembly will provide the desired alignment of the rod and sleeve tube to each other. The grip around the rod and the sleeve tube is provided by the collars (32 and 33) and O-rings (12 and 14).

Figure 7:
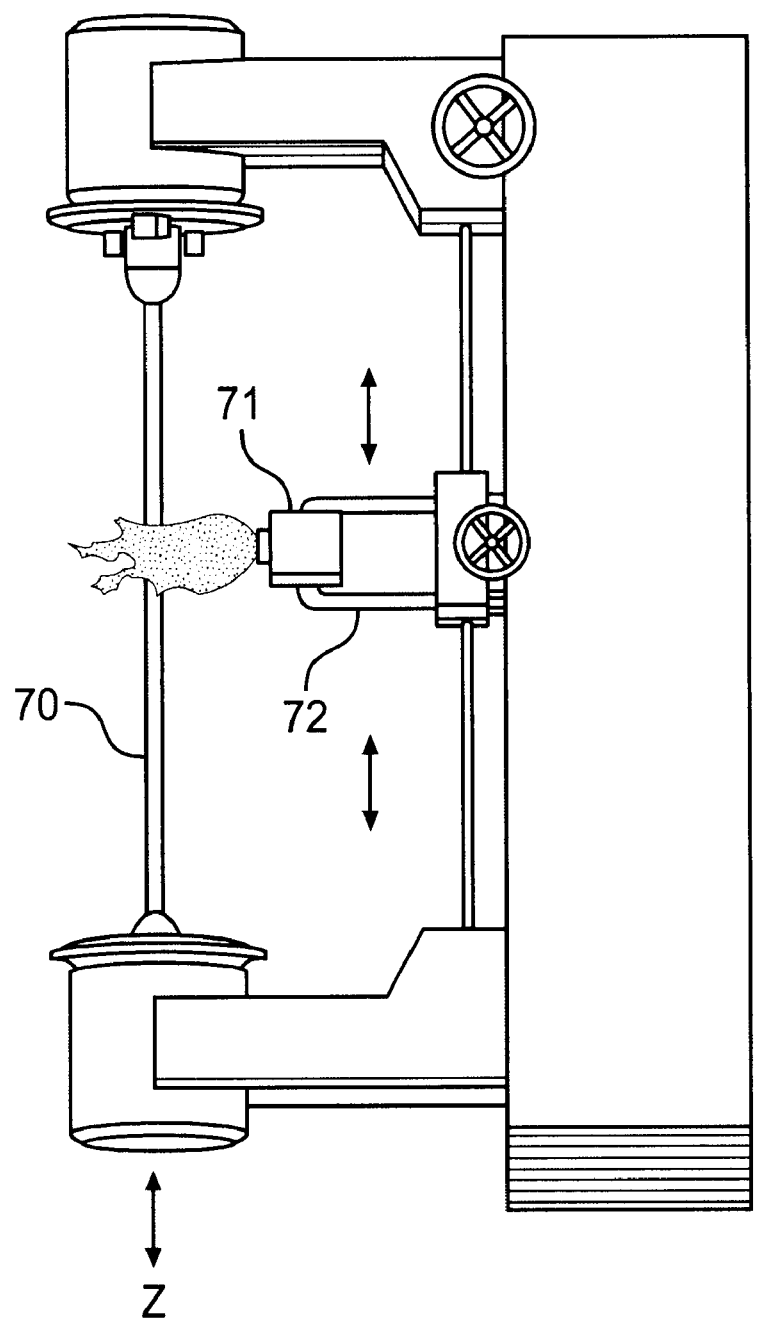
FIG. 7 is a schematic view of a preferred apparatus for practicing the invention.

The assembly comprising the above device with the aligned rod and tube is then mounted onto a controllable speed lathe that is preferably a glass lathe having simultaneously rotating chucks oriented vertically so that the supported ends will not be subjected to substantial torque and the assembly will not sag upon heating. FIG. 7 schematically illustrates an example of such a lathe wherein a rod and tube assembly 70, could be mounted. Reference is also made to U.S. Pat. Nos. 5,221,306 and 5,578,106, for a more detailed understanding of this lathe, which patents are incorporated herein by reference.

The device 22, illustrated in detail in FIG. 5, is fitted to the top of the preform and serves as a handle extending through a central opening in one of the chucks that is modified so that the annular gap 11 between the rod and tube can be partially evacuated. A concentric channel extends via a rotary seal 36 to the open center of the gasket, thereby placing the annular gap 11 in communication with a vacuum pump, through a "quick fit" connector 35. The assembly may be locked with a C-groove (not shown) onto a rotating plate 34, and then connected to the lathe. The assembly is locked in place using the metal ring 38. The assembly may be rotated prior to finally locking in place, in order to give the truest vertical orientation on the lathe. A tube (not shown) is connected to the connector 35 to allow for the application of a vacuum. The lower end of the preform rod is held by jaws (not shown) mounted on the lower chuck of the lathe.

The controllable speed lathe comprises a torch 71, or comparable heat source, which is mounted on a three-axis positioning stage 72 based on the same bed (not shown) as the lathe so that the torch position can be precisely controlled during operation. A computer (not shown) may be provided to coordinate and control the rotation of the body 70 via the lathe and the movement of the heat source 71. The computer also controls the rotational speed of the body 70 about the Z axis and the speed of the heat source 71 along the Z axis. Step motors (not shown) are provided to drive the three axes of the positioning stage controlling the location and traverse speed of the heat source 71. At the beginning of the process, the torch is positioned at the lower end of the tube, in correspondence with the contact point of the tube with the increased diameter 21 of the rod.

Figure 6:
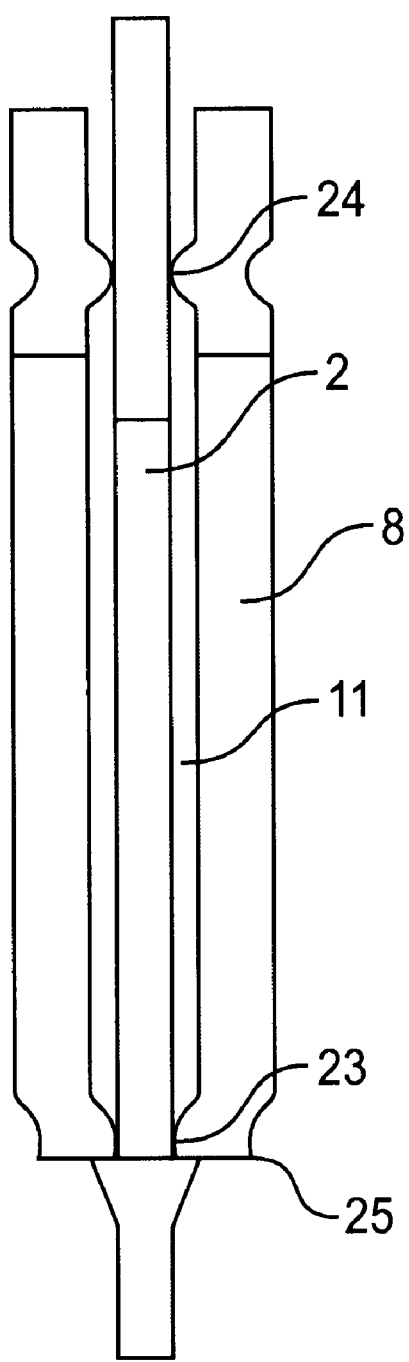
FIG. 6 is a schematic view of a preform incorporating the present invention.

In the next step, as illustrated in FIG. 6, the heat source (not shown) forms a seal 25 between the lower end of the tube 8 and the rod 2. The collapsed section should have a sufficient length so to allow an easy handling of the preform during the subsequent drawing phase, when the end of the preform is initially heated in order to be drawn into an optical fiber. Accordingly, the seal 25 has preferably a length of from about 5 to 10 mm.

The heat source is typically a burner, for instance a hydrogen/oxygen burner, which allows to bring the collapsing zone of the preform at a temperature slightly lower than those generally applied for the drawing phase, said collapsing temperature being preferably comprised between 1800° C. and 2000° C., preferably being about 1900° C.

Other heat sources which may be employed in the present process are small furnaces, such as graphite resistance furnaces or induction furnaces. Alternatively, a plasma torch can be used. The heat source thus traverses the tube 8 at a predetermined collapse speed, collapsing a section of the tube onto the rod at said lower end of the tube at 23. During the collapsing phase, the traverse speed of the heat source is preferably from about 5 to about 30 mm/min. In particular, depending on the temperature of the employed heat source, such a collapse speed should be maintained at a sufficient rate so to avoid unnecessary overheating of the collapsing zone; nevertheless, the speed should also be not too high, for allowing a complete and relatively rapid collapsing of the tube in the desired zone. Another parameter which determines the traverse speed of the heat source during the collapsing phase is the dimension of the tube to be collapsed, in particular its thickness. Typically, thicker tubes will require a slower traverse of the heat source, in order to sufficiently heat the glass. For instance, according to applicant experience, a two fold increase in the wall thickness results in a two fold reduction of the collapse speed for the same burner design.

A vacuum (not shown) is then preferably applied to partially evacuate the annular gap 11 between the rod 2 and tube 8 for the remainder of the time the preform is being prepared on the lathe. In general, to facilitate the collapsing of the tube, it is sufficient to apply a vacuum slightly lower than the ambient pressure, for instance of about 0.95 bar. However, the applicant has observed that an increase of the vacuum, for instance at about 0.010 bar or lower, may further facilitate the collapsing of the tube, thus allowing to increase the process rate.

After collapsing the lower end of the assembly, the traverse speed of the heat source is increased until it reaches the top section of the tube. The travelling of the heat source on the central part of the preform should be sufficiently rapid to avoid any collapse of the tube onto the rod, thereby insuring that the annular gap 11 remains substantially intact. The applicant has however noticed that if the speed of this traverse is too fast, thermal cracking of the preform can occur. As a matter of fact, if the traverse speed of the heat source is too fast, the fused silica in the collapsed zone becomes cold too quickly and cracks occur at the stress boundaries. The applicant has noticed that by applying a predetermined traverse speed, said thermal crackings of the preform may be prevented. In particular, said speed should be sufficiently slow so to avoid said crackings in the preform, but nevertheless sufficiently rapid so to avoid any collapsing of the central zone of the tube. Accordingly, the applicant has noticed that the traverse speed of the heat source in this step of the process should be from about two to about eight times the traverse speed applied for the collapsing step, preferably from about two to about six times. Thus, depending on the temperature of the heat source and on the dimensions of the tube to be collapsed, the heat source is preferably moved with a traverse speed of from about 30 to about 150 mm/min between the two collapsing zones.

As the heat source reaches the top of the preform, the heat source speed is reduced again, so that the burner collapses and seals an upper section of the tube onto the rod at 24. The collapse speed of the heat source for collapsing this second section is substantially the same applied for the first section. The length of this collapsed second section may however be lower than the length of the opposite collapsed section, as this section is not subjected to the initial melting phase of the drawing step. Typically its length is comprised from about 2 to about 5 mm. The annular gap should be completely sealed off by this point, so that the evacuated condition is maintained within the preform throughout the drawing process.

The burner is then lowered to the lower handle 3 and allowed to burn through the handle below the sealed area of the preform 23 so that final preform is shorter and able to be carried more easily. The finished preform may then be removed from the lathe and vertically mounted in the drawing tower.

During the whole process, the lathe is preferably maintained at a rotating speed of from about 2 to about 10 r.p.m., preferably at about 5 r.p.m.

According to an alternative embodiment, instead of forming a complete seal at the lower end of the tube, the tube is only partially sealed onto the rod, for a length corresponding to about 10–30% of the final length of the seal 25. In particular, a lower portion of the lower section is collapsed. Then vacuum is applied and the heat source travels a first time up to the opposite end of the tube, at a first predetermined traverse speed, to allow removal of any residual volatile compound adhering to the inner wall of the tube or onto the rod. The heat source is then repositioned at the lower end by moving it along the tube at about the first traverse speed. The sealing of the lower section is then completed and the process continues as previously described, with the travelling of the heat source towards the opposite end of the tube at a second traverse speed and the collapsing of the second section of the tube.

Said first and second predetermined traverse speed may be both from about two to about eight times higher than said predetermined collapse speed. Preferably, said first predetermined traverse speed is from about two to six times higher than said predetermined collapse speed, while said second predetermined traverse speed is from about four to eight times higher than said predetermined collapse speed.

The applicant has observed that by applying this double-pass traversing of the heat source along the whole length of the tube, an improved removal of the volatile components from the rod/tube interface can be obtained, while the preform is submitted to an additional heat treatment which improves the final characteristics of the optical fibers obtained from such preform. In particular, by only partially collapsing the lower portion of the lower section of the tube, an improved removal of such volatiles can be obtained in the collapsing zone. This improved removal of volatiles reduces the risk of bubbles formation during the subsequent drawing phase, in particular in the zone of the sealed end of the preform.

As it can be appreciated by the above description, the present invention provides an easier and faster method for a correct alignment of the tube with the rod prior to mounting them onto the glass lathe, thus avoiding the troublesome operations required by the prior art for centering the tube and the rod directly onto the lathe. In addition, the control of the relative movement of the heat source along the tube to be collapsed reduces the risks of cracks in the final preform, as well as bubble formation during the subsequent drawing phase.

FIG. 2 is a schematic view of the preform assembled according to FIG. 1, positioned in the drawing tower (not shown). The lower end of the preform 19 exposed to the heat source 16 is melted off so as to form a neck down region 17 where the tube 8 is collapsed onto the rod 2 thereby allowing solid optical fiber 18 to be drawn in a controlled manner. During the fiber drawing stage, this lower end of the preform remains collapsed and sealed while the fiber 18 is drawn, so as to insure that the annular gap 11 remains sealed and under a vacuum.

What is claimed is:

1. A method of making an optical fiber preform, comprising the steps of:

centrally positioning a rod within a tube, providing an annular gap between the outer surface of the rod and the inner surface of the tube;

mechanically forming a seal between one end of said tube and said rod, while aligning said tube with said rod with respect to each of their longitudinal axes;

thermally collapsing a first section of the tube onto the rod by traversing a heat source along said first section of the tube at a predetermined collapse speed, said section being located at an end of said tube opposite from the mechanically formed seal, in order to sealingly close said opposite end of said tube onto said rod;

applying a force for biasing the tube inwardly towards the rod;

moving the heat source towards a second section of the tube, located in the proximity of the mechanically formed seal, by traversing said heat source at a predetermined traverse speed, so to avoid any collapsing of the tube onto the rod between the first and second sections and to avoid any thermal cracking of the preform;

thermally collapsing said second section of the tube onto the rod by traversing said heat source along said second section of the tube at substantially said predetermined collapse speed.

2. The method of claim 1 wherein said force for biasing the tube inwardly towards the rod is achieved by at least partially evacuating the annular gap through the mechanically formed seal.

3. Method according to claim 1 wherein said predetermined traverse speed of the heat source is from about two to about eight times higher than said predetermined collapse speed.

4. Method according to claim 1, wherein the step of mechanically forming a seal between one end of said tube and said rod, while aligning said tube with said rod with respect to each of their longitudinal axes, is carried out by using a device, thus forming an assembly comprising the device and the aligned rod and tube, said assembly being then mounted on a glass lathe.

5. Method of making an optical fiber preform, comprising the steps of:

centrally positioning a rod within a tube such that a gap exists between an outer surface of the rod and an inner wall of the tube and mechanically forming a seal between one end of said tube and said rod;

thermally collapsing a first portion of a first section of the tube, said first section being located at an end of said tube opposite from the mechanically formed seal, by traversing a heat source along said first portion of the tube at a predetermined collapse speed, in order to sealingly close said first portion of said first section of the tube onto said rod;

applying a force for biasing the tube inwardly towards the rod;

moving the heat source to a second section of the tube, located in the proximity of the mechanically formed seal, and back to said first section, to allow removal of residual volatile compounds adhering to the inner wall of the tube or onto the rod, by traversing said heat source at a first predetermined traverse speed, said first predetermined traverse speed being such as to avoid any collapsing of the tube onto the rod between the first and second sections and to avoid any thermal cracking of the preform;

thermally collapsing a remaining portion of said first section of the tube, by traversing the heat source along said remaining portion at substantially said predetermined collapse speed;

moving the heat source to the second section of the tube by traversing the heat source at a second predetermined traverse speed, said second predetermined traverse speed being such as to avoid any collapsing of the tube onto the rod between the first and second sections and to avoid any thermal cracking of the preform; and thermally collapsing the second section of the tube onto the rod by traversing said heat source along said second section of the tube at substantially said predetermined collapse speed.

6. Method according to claim 5 wherein said first portion of the first section is from about 10% to about 30% of the length of the first section.

7. Method according to claim 5 wherein said first predetermined traverse speed is from about two to six times higher than said predetermined collapse speed, and said second predetermined traverse speed is from about four to eight times higher than said predetermined collapse speed.

8. The method according to claim 5, wherein the step of mechanically forming a seal between one end of said tube and said rod is performed using a device, thus forming an assembly comprising the device and the aligned rod and tube, said assembly being then mounted on a glass lathe.

9. The method according to claim 5, wherein said force for biasing the tube inwardly towards the rod is achieved by at least partially evacuating the annular gap through the mechanically formed seal.

* * * * *